United States Patent
Palmert

(10) Patent No.: US 10,572,562 B2
(45) Date of Patent: *Feb. 25, 2020

(54) METHODS AND SYSTEMS FOR PERFORMING TIME-PARTITIONED COLLABORATIVE FILTERING

(71) Applicant: salesforce.com, inc., San Francisco, CA (US)

(72) Inventor: Joel Palmert, Stockholm (SE)

(73) Assignee: salesforce.com, inc., San Francisco, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 15/479,181

(22) Filed: Apr. 4, 2017

(65) Prior Publication Data

US 2017/0206281 A1    Jul. 20, 2017

Related U.S. Application Data

(62) Division of application No. 13/633,730, filed on Oct. 2, 2012, now Pat. No. 9,639,616.

(Continued)

(51) Int. Cl.
G06F 16/9536 (2019.01)
G06F 16/9535 (2019.01)
G06F 16/22 (2019.01)

(52) U.S. Cl.
CPC ...... *G06F 16/9536* (2019.01); *G06F 16/2282* (2019.01); *G06F 16/9535* (2019.01)

(58) Field of Classification Search
None
See application file for complete search history.

(56) References Cited

U.S. PATENT DOCUMENTS 5,577,188 A    11/1996    Zhu
5,608,872 A    3/1997    Schwartz et al.
(Continued)

OTHER PUBLICATIONS

"A Collaborative Filtering Algorithm based on Time Period Partition," by Zhang et al. 2010 IEEE, 4 pages.
(Continued)

*Primary Examiner* — James Trujillo
*Assistant Examiner* — John J Morris
(74) *Attorney, Agent, or Firm* — Elliot, Ostrander & Preston, P.C.

(57) ABSTRACT

In accordance with disclosed embodiments, there are provided methods, systems, and apparatuses for performing time-partitioned collaborative filtering in an on-demand service environment including, for example, receiving as input, a plurality of access requests for data stored within the host organization and a corresponding plurality of actions for the data to which access is requested; accessing an input table having a time field, action field, item field, and agent field therein; recording time data and agent data for each of the received plurality of access requests and the corresponding plurality of actions; recording an item within the item field and an action within the action field for each of the received plurality of access requests and the corresponding plurality of actions based on the action performed on an item of the data to which access is requested; and analyzing the input table to generate one or more pairs of first actions and items to second actions and items and a time based score for each of the one or more pairs, in which the time based score is dependent upon a time between the actions for each of the one or more pairs. Other related embodiments are disclosed.

20 Claims, 7 Drawing Sheets

Related U.S. Application Data

(60) Provisional application No. 61/545,256, filed on Oct. 10, 2011.

(56) References Cited

U.S. PATENT DOCUMENTS

| | | | |
|---|---|---|---|
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 * | 1/2005 | Warner | G06F 17/30873 |
| 6,850,895 B2 | 2/2005 | Brodersen et al. | |
| 6,850,949 B2 | 2/2005 | Warner et al. | |
| 7,340,411 B2 | 3/2008 | Cook | |
| 7,430,561 B2 | 9/2008 | Bailey et al. | |
| 7,620,655 B2 | 11/2009 | Larsson et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0122974 A1 | 6/2006 | Perisic | |
| 2006/0282504 A1 * | 12/2006 | Yoshioka | G06Q 10/10 709/207 |
| 2008/0319986 A1 * | 12/2008 | Shapira | G06F 17/30867 |
| 2009/0077093 A1 | 3/2009 | Sarma et al. | |
| 2011/0196852 A1 | 8/2011 | Srikanth et al. | |
| 2011/0238615 A1 | 9/2011 | Sinha | |

OTHER PUBLICATIONS

Non-Final Office Action for U.S. Appl. No. 13/633,730 dated Dec. 31, 2015, 39 pages.

Gawlick, D. et al., "Applications for Expression Data in Relational Database Systems," Apr. 2, 2004, 12 pages.

* cited by examiner

METHODS AND SYSTEMS FOR PERFORMING TIME-PARTITIONED COLLABORATIVE FILTERING

CLAIM OF PRIORITY

This divisional application is related to, and claims priority to, the non-provisional utility application entitled "Methods and Systems for Performing Time-partitioned Collaborative Filtering," filed Oct. 2, 2012, having an application Ser. No. 13/633,730, and is further related to, and claims priority to, the provisional utility application entitled "Methods and Systems for Performing Time-partitioned Collaborative Filtering," filed on Oct. 10, 2011, having an application Ser. No. 61/545,256, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments relate generally to the field of computing, and more particularly, to systems and methods for performing time-partitioned collaborative filtering in an on-demand service environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to the claimed embodiments.

Computing systems and algorithms which interact directly with users sometimes will make recommendations to those users. For instance, such systems may provide recommendations to a user for a search, a product, an event, etc.

Collaborative filtering (CF) is a technique used by some recommender systems. The concept of collaborative filtering has both a broad and a narrow context. Broadly speaking, collaborative filtering is the process of filtering for information or patterns using techniques involving collaboration among multiple agents, viewpoints, data sources, and so forth. Applications of collaborative filtering often involve very large data sets in which the collaborative filtering methods are applied in a variety of implementation environments including, for example, sensing and monitoring data in mineral exploration, environmental sensing over large areas or multiple sensors; financial data in financial services, user data in electronic commerce and web 2.0 applications, etc.

In the narrower context, collaborative filtering is a method of making automatic predictions (filtering) about the interests of a system user by collecting preferences or taste information from many users (collaborating) such that the recommendation system may attempt to provide "recommendations" to the system users. In such a model, the method operates on the blind assumption that where user A shares the same opinion as a user B for a given issue x, then user A is more likely to share user B's opinion on a different issue y than to share the same opinion as user z chosen at random.

Unfortunately, implementing what may be a theoretically preferred method, has been found in actual practice to be computationally expensive due to the massive number of potential data point pairs that must be analyzed. For instance, it is wholly feasible to have billions of data points relevant to the desired prediction/recommendation, and while such a large population may be theoretically beneficial to the accuracy of a resulting prediction, the reality of providing computational hardware capable of performing such analysis for a system interacting with many users in real time fails to yield the necessary return. Greater computational efficiency is therefore needed to justify use of such a recommendation system in practice. Improved accuracy could also be realized through new techniques.

The present state of the art may therefore benefit from methods, systems, and apparatuses for performing time-partitioned collaborative filtering in an on-demand service environment as described herein.

BRIEF DESCRIPTION OF THE DRAWINGS

Embodiments are illustrated by way of example, and not by way of limitation, and will be more fully understood with reference to the following detailed description when considered in connection with the figures in which.

DETAILED DESCRIPTION

Figure 1:
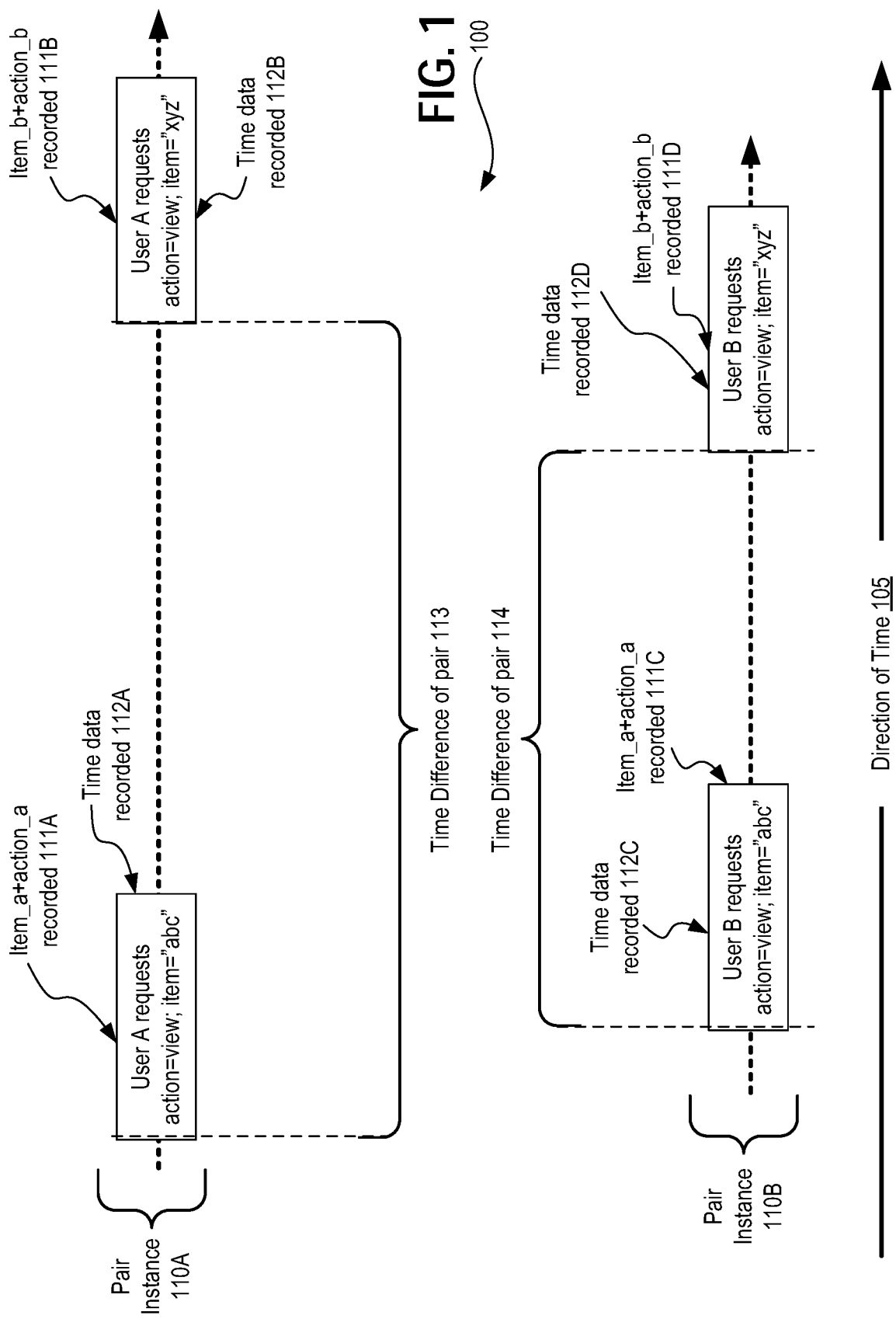
FIG. 1 depicts an exemplary architectural overview of the environment in which embodiments may operate.

Described herein are systems, devices, and methods for performing time-partitioned collaborative filtering in an on-demand service environment.

In one embodiment, such mechanisms include receiving as input, a plurality of access requests for data stored within the host organization and a corresponding plurality of actions for the data to which access is requested; accessing an input table having a time field, action field, item field, and agent field therein; recording time data and agent data for each of the received plurality of access requests and the corresponding plurality of actions; recording an item within the item field and an action within the action field for each of the received plurality of access requests and the corresponding plurality of actions based on the action performed on an item of the data to which access is requested; and analyzing the input table to generate one or more pairs of first actions and items to second actions and items and a time based score for each of the one or more pairs, in which the time based score is dependent upon a time between the actions for each of the one or more pairs. In certain embodiments of time-partitioned collaborative filtering two potentially distinct sets of agent-action-item-times are analyzed where the actions and the items are different but where the users overlap, that is, the users are the same. For example, one user triggers different actions and items which is captured for analysis. In another variation of time-partitioned collaborative filtering two inputs may be identical in terms of the actions and the items, but different users triggered the respective inputs. In either case, a time dimension is further considered through the analysis as is described below. As used herein, a "table" does not need to be a "table" in the sense of a database. Rather, reference to the term "table" merely indicates that such data is structured as a table, such as a list of agent-action-item-times, in the case of an exemplary "input table."

As is described herein, a collaborative filtering algorithm relates all pairs of items in a system by how many times the two items have been accessed by the same user. For example, when a user accesses item 1, the algorithm may predict that such a user will also access item 2 if the two items are evaluated to be highly related based on the behavior of other users within the system, that is to say, based on other users within the system having often accessed both item 1 and item 2 together, the collaborative filtering algorithm may then make a determination that these two exemplary items exhibit high correlation, and thus, the user in question may be "predicted" (e.g., is algorithmically considered "more likely") to access item 2 after being observed to have accessed item 1.

Take for instance an exemplary user buying books. Two distinct books having no express relationship manually specified between them may nevertheless be established as a "related" pair if the same user within the system has bought both books. The more users of the system to buy the same pair of books results in the books being more "related." Thus, when another user buys one of the two books, said user may be predicted or at least considered more likely to also buy the second of the two books based on the past behavior of other users within the system.

Unfortunately, where massive amounts of data exists for many users within a system presenting interactions with potentially millions of distinct items or system elements, the computational requirements for calculating all pairs observed by such a system quickly becomes infeasible, notwithstanding the potential benefit of evaluating all such pairs. Further still, the preferences and behaviors of users change over time, and thus, the predictive value of users' behaviors and preferences within such a system may decrease overtime. The problem of ever increasing computational demand as the size of a data set increases and the problem of decreasing value of data pairs with elements separated by greater amounts of time remains to be addressed by those having skill in the relevant arts.

Therefore, it is in accordance with certain embodiments that available data is evaluated in context of a time dimension. For instance, the predictive value of related pairs having elements further apart in time from one another may be de-emphasized or weighted poorly and the predictive value may be increased or weighted more aggressively for related pairs having elements closer in time to one another.

In other embodiments, the data may be partitioned into overlapping time chunks. Data is chunked, or broken up, into time chunks so that a current iteration of analyzing may consider only item pairs from within the same time chunk. It is this time chunking technique which yields performance gains since it is no longer necessary to consider all pairs from within an entire data population. The reason such a technique is feasible, without unduly losing prediction quality, is because if two items appear in different chunks and they happen so far away in time from one another, then those items will be given a low weight that wouldn't affect the result significantly, even if both items had been within the same time chunk. However, it is still necessary to account for two items that occurred close in time that could fall into distinct time chunks. Because such close in time items would yield a greater weight, they do affect a score significantly and should be included. Thus, when time chunking so as to allow for iterative processing, the time chunks are allowed to overlap. For instance, in input table may be broken up so long as there is some overlap in the time dimension between records of the table. Because user data is also recorded, according to certain embodiments, then were item_a is accessed late in time chunk 1 and item_b is accessed early in time chunk 2, then the analysis will recognize and consider such a pair as being close in time, regardless of the fact that they are in disparate time chunks, thus allowing a more greatly weighted time based score to contribute appropriately, despite the analysis being broken into iterative cycles.

In such an embodiment, the results from the time chunks are then summed together to establish a time based score for any given pair, in which the time based score is indicative of the "relatedness" or predictive value of the given pair.

In those embodiments where the analysis is applied to overlapping time chunks rather than entire data sets, it is possible to iteratively perform the analysis over time, and each time, apply the analysis to only the last time chunk. For instance, the analysis may be applied to time chunks of the total data set iteratively each hour, day, week, etc., but only to the last time chunk, such that the analysis can be made to execute incrementally, each iteration taking account of the newest data, without having to fully re-evaluate an entire available data set, while at the same time, benefiting from prior analysis through the preceding time chunks for such a data set. Such a model again improves computational efficiency by negating the need to re-evaluate older available data. Such previously available data can be considered, scored, and then new time chunks corresponding to subsequently received data may be evaluated, scored, and aggregated to the results of preceding time chunks.

In certain embodiments, pairs having elements occurring too distant in time based on the time data recorded are simply discarded and remaining pairs are weighed according to their closeness in time, for example, based on when in time the data elements constituting the pair were accessed. Such an approach may improve predictive accuracy by weighting more relevant pairs higher.

In other embodiments, certain pairs are discarded according to a directionality mandate implemented via the analysis. Stated differently, pairs may be wholly discarded and thus, given no scoring consideration, where the second element of a pair is accessed in time before the first item in a pair. Thus, for pair instances where item 1 is accessed and then item 2 is subsequently accessed, the pair instance will be considered valid and given a time based score or weighted appropriately for scoring. Conversely, pair instances where item 2 is accessed and then item 1 is subsequently accessed, the pair instance will be deemed ineligible for consideration and simply ignored by the scoring mechanism. Such an approach again improves performance and computational efficiency by discarding roughly half of the remaining pairs. Instituting such directional predictions may improve predictive accuracy for the given pair. Thus, if many users are observed to access item 1 and then item 2, in that order, then it can be predicted that a user accessing item 1 is more likely to access item 2 also, whereas a user accessing item 2 will not be predicted by the system to later access item 1. In such a way, practice of the disclosed embodiments can be utilized to make recommendations to system users of a multi-tenant database system. For example, recommendations may be provided to users as to what records may be viewed next, and with good predictive value through the preceding analysis, the user's experience can be enhanced, made more efficient, and/or expedited through consumption of the recommended records for viewing. For example, accepting a recommended record for viewing may be faster or easier for the user than specifying such a record (e.g., clicking a link or selecting an item through a recommendation list may be preferred over typing a record request, etc.). Such recommendations may therefore be based on the preceding analysis and based further on whatever records the user is presently viewing or previously viewed, by way of example.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems where are not directly discussed.

FIG. 1 depicts an exemplary architectural overview 100 of the environment in which embodiments may operate in the contest of a time dimension, specifically, the direction of time depicted at element 105. Here, there are two pair instances 110A and 110B, each of which represent distinct instances or occurrences of the same identical pair. As can be seen with regard to pair instance 110A, user "A" requests an action=view for an item="abc." In isolation, this event is meaningless, and offers no predictive value whatsoever. Nevertheless, item_a+action_a is recorded at element 111A for the requested data and action by the user "A," and also recorded is time data at element 112A. Later in time, the same user "A" requests action=view and item="xyz" and the item_b+action_b is recorded at element 111B along with time data being recorded at element 112B. Because both requests were made by user "A" the pair instance 110A is established as a pair. At element 113, it is shown that time difference of the pair is determinable from the time data recorded at 112A and 112B.

Similar to the above, at pair instance 110B, user "B" requests an action=view for an item="abc" and item_a+action_a is recorded at element 111C for the requested data and action by the user "B." Also recorded is time data at element 112C. Later in time, the same user "B" requests action=view and item="xyz" and the item_b+action_b is recorded at element 111D along with time data being recorded at element 112D. Because both requests were made by user "B" the pair instance 110A is established as a pair. At element 114, it is shown that time difference of the pair is determinable from the time data recorded at 112C and 112D.

Notably in this example, one "pair" is recognized, but two instances of the same identical pair are present, having been established by each of users "A" and also "B." Many users can create instances of a given pair of action+item elements. Additionally, it is permissible for the same user to also create multiple instances of a given pair of action+item elements, since each will have associated time data recorded therewith.

Further notable from this example is that the time difference of pair instance 110A according to element 113 is greater than the time difference of pair instance 110B according to element 114. Thus, the pair instance 110B may be considered more relevant than the pair instance 110A having elements that are further away in time from one another.

In addition, it can be seen from exemplary architecture 100 that the analyzing described further takes into an account an "action" for a given "item" being accessed. Such an item may be data within a record or row of the database, or an object retrieved for viewing or manipulation, etc.

Thus, the analyzing increases its predictive value by requiring a "pair" to represent a first item and action for the first item and a second item and action for the second item, resulting in item-to-item pairs with complementary actions for each mapped item. Thus, resulting output of the analysis constitutes the following fields: (1) action a; (2) item a; (3) action b; (4) item b, and (5) time based score, in which the time based score, which is the sum of pairs where each pair gets a weight inversely proportional to some function of the time difference. Time data may be recorded within a time field of an input table based upon which relatedness may then be assessed using the described analysis.

A user (e.g., user "A" or "B"), or more generally an agent, is relevant when determining that a pair is to be considered, because for a pair to be considered, both items in the pair need to be accessed by the same user. Stated differently, a "pair" is only considered a "pair" if the user is the same.

In the preceding examples, a "view" action is specified, yet other "actions" are also permissible. For instance, a user may cause an item or record to be deleted, updated, inserted, copied, and so forth, as the applicable action.

A user may establish multiple pairs through a sequence of interactions with the system, each subsequent interaction being further in time from a first interaction (e.g., action=view and item="abc" by user "A") and additionally, time data may be recorded and measured between intermediate interactions.

In certain embodiments, only the most relevant pair is evaluated by the analysis in which relevance is determined based on the least time difference among the elements of any pair among any and all users.

Figure 2:
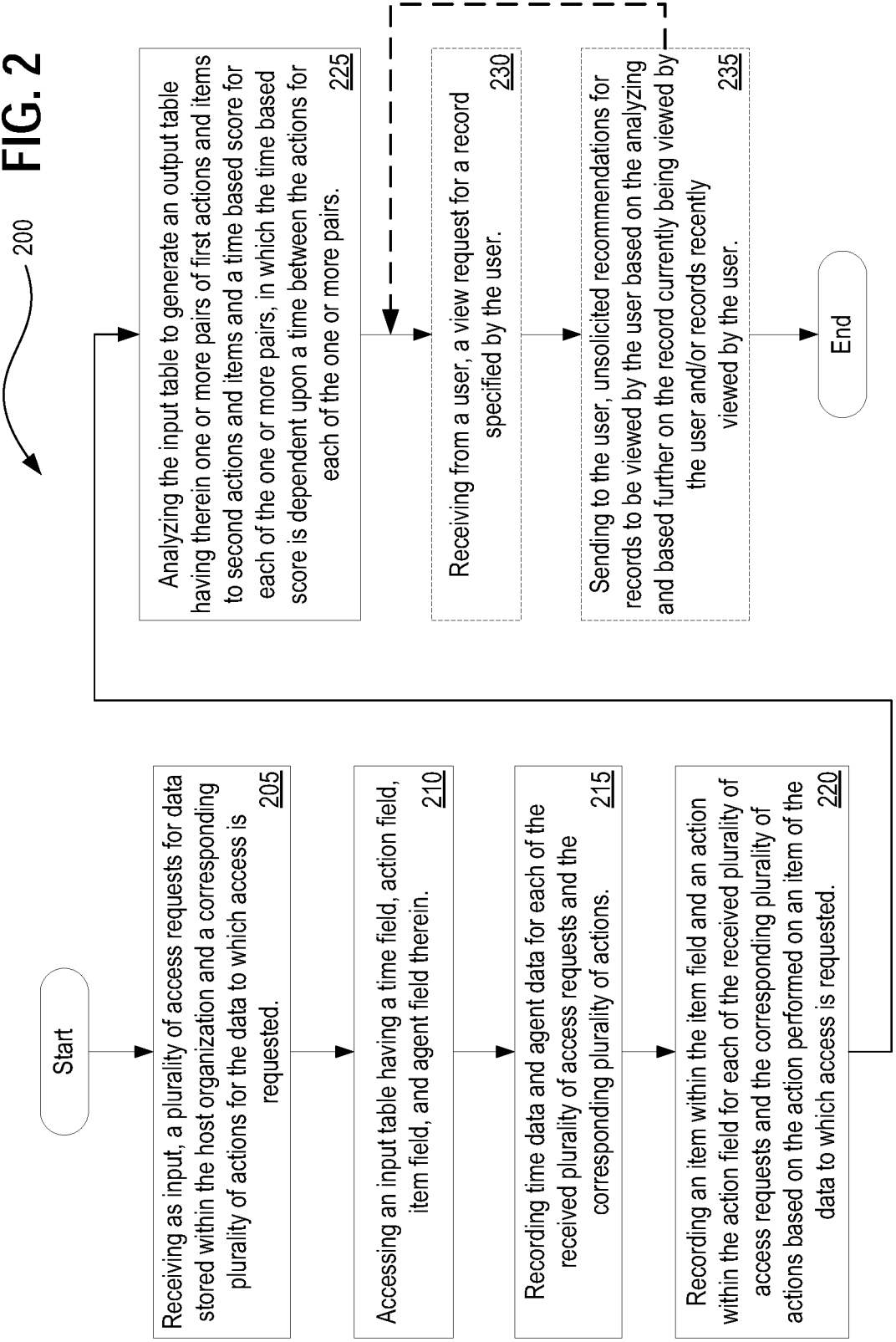
FIG. 2 is a flow diagram illustrating a method for performing time-partitioned collaborative filtering in an on-demand service environment in accordance with disclosed embodiments.

FIG. 2 is a flow diagram illustrating a method 200 for performing time-partitioned collaborative filtering in an on-demand service environment in accordance with disclosed embodiments.

Method 200 may be performed by processing logic that may include hardware (e.g., circuitry, dedicated logic, programmable logic, microcode, etc.), software (e.g., instructions run on a processing device to perform various operations such receiving, accessing, recording, analyzing, generating, populating, storing, updating, sorting, ranking, and transmitting information and data in pursuance of the systems and methods for performing time-partitioned collaborative filtering in an on-demand service environment, as described herein. Some of the blocks and/or operations listed below are optional in accordance with certain embodiments. The numbering of the blocks presented is for the sake of clarity and is not intended to prescribe an order of operations in which the various blocks must occur.

Method 200 begins with processing logic at block 205 for receiving as input, a plurality of access requests for data stored within a host organization and a corresponding plurality of actions for the data to which access is requested.

At block 210, processing logic accesses an input table having a time field, action field, item field, and agent field therein.

At block 215, processing logic records time data and agent data for each of the received plurality of access requests and the corresponding plurality of actions.

At block 220, processing logic records an item within the item field and an action within the action field for each of the received plurality of access requests and the corresponding plurality of actions based on the action performed on an item of the data to which access is requested.

At block 225, processing logic analyzes the input table to generate an output table having therein one or more pairs of first actions and items to second actions and items and a time based score for each of the one or more pairs, in which the time based score is dependent upon a time between the actions for each of the one or more pairs. For example, the output table may be a collaborative filter table generated, updated, or populated as a result of the analyzing to hold the output. At this point, all of the generated pairs are stored. These stored results will then be used to serve recommendations to many users, and thus, not all the stages in need to be repeated every time a recommendation is served to a user.

At block 230, processing logic receives, from a user, a view request for a record specified by the user.

At block 235, processing logic sends to the user, unsolicited recommendations for records to be viewed by the user based on the analyzing and based further on the record currently being viewed by the user and/or records recently viewed by the user. The hashed line from 235 indicates that processing may return to the flow just before block 230, and receive new requests and send new recommendations, without having to re-perform the prior operations.

According to one embodiment of the method 200, the input table further includes an agent having initiated the action on the item; and further in which the input table records each of (i) agent, (ii) action, (iii) item, and (iv) time, for each of the plurality of access requests received as input. An "agent" may be, for example, a user of the available system, or an such entity or agent capable of triggering a request which is received with the input.

analyzing the input table to generate the one or more pairs includes generating as output, the one or more pairs based on the analyzing.

According to another embodiment of the method 200, analyzing the input table to generate the one or more pairs includes generating a collaborative filter table as output for each of the one or more pairs: (i) action_a; (ii) item_a subjected to action_a by any entity; (iii) action_b; (iv) item_b subjected to action_b by the same entity; and (v) the time based score having been derived based at least in part on a time difference between item_a subjected to action_a and item_b subjected to action_b by the same entity. Thus, four distinct fields or output elements are yielded along with a time based score according to such an embodiment. The time based score may represent predictive value or relatedness of the pair upon which future recommendations may be based.

According to another embodiment of the method 200, analyzing the input table to generate the one or more pairs includes outputting, for each of the one or more pairs: a first action and a first item and a second item and a second item as a related pair when an entity performing the first action on the first item as the data requested with a first access request also performs the second action on the second item as the data requested with a second access request by the same entity; and a time based score based at least in part on a difference between first time data recorded for the first action on the first item and second time data recorded for the second action on the second item.

According to another embodiment of the method 200, analyzing the input table to generate the one or more pairs and the time based score for each of the one or more pairs includes: increasing scoring for pairs occurring with greater frequency over pairs occurring with lesser frequency.

According to another embodiment of the method 200, analyzing the input table to generate the one or more pairs and the time based score for each of the one or more pairs includes: increasing scoring for pairs having elements occurring closer in time to one another over pairs having elements occurring greater in time from one another. According to a variant of such an embodiment, increasing scoring for pairs having elements occurring closer in time to one another over pairs having elements occurring greater in time from one another includes: determining a difference between first time data recorded for a first action on a first item of the pair and second time data recorded for a second action on a second item of the pair; and performing one of the following special case operations to the difference: (a) applying a linear weighting to the difference of the pair, in which pairs having elements closer in time to one another result in a greater linear weighting over pairs having elements occurring greater in time from one another; (b) applying a weighting proportional to a function f of the time difference, in which f is monotonically decreasing so that a greater time difference results in a lower score; (c) applying an exponential weighting function f where f=2^(-k*timeDiff); or (d) applying a squared weighting function f where f=timeDiff^(-0.5). Such special case operations are not required according to certain embodiments, but may optionally be employed, as desired.

According to another embodiment of the method 200, analyzing the input table to generate the one or more pairs and the time based score for each of the one or more pairs includes: establishing a pair when any entity performing a first action on a first item also performs a second action on a second item; and applying a weighted time based score to the pair established based on a difference between first time data recorded for the first action on the first item and second time data recorded for the second action on the second item.

According to another embodiment, the method 200 further includes: establishing a second pair, identical to the first pair, when any second entity performing a first action on a first item also performs a second action on a second item; applying a second weighted time based score to the second pair established based on a difference between third time data recorded for the first action on the first item and fourth time data recorded for the second action on the second item; and summing the first weighted time based score for the first pair and the second weighted time based score for the second pair, in which the summing represents both frequency of the established pairs and time relatedness of the established pairs' respective elements.

According to another embodiment, recording time data within the time field for each of the received plurality of access requests and the corresponding plurality of actions includes one of: (a) recording a time stamp representing when each item is accessed; (b) recording a time stamp representing when each action is performed on the corresponding item of the data to which access is requested; or performing both, thus (c) recording both (a) and (b).

According to another embodiment, analyzing the input table to generate one or more pairs of first actions and items to second actions and items and a time based score for each of the one or more pairs includes: applying a weighted time based score to every instance for a pair in which a first item subjected to a first action by any entity is matched to a second item subjected to a second action by the same entity; summing all weighted time based score s for every instance of the pair resulting in a summed score for all instances of the pair, in which every instance of the pair contributes to the summed score, and further in which instances of the pair having a smaller time difference between the first action and second action contribute greater to the summed score than instances of the pair having a greater time difference between the first action and the second action.

According to another embodiment, analyzing the input table to generate one or more pairs of first actions and items to second actions and items and a time based score for each of the one or more pairs includes: eliminating any instance of a pair from scoring when a time difference between a first action and a second action for the instance of the pair exceeds a time threshold or is less than a score threshold, where the score threshold is proportional to the time threshold according to a weighting function f; applying a weighted time based score to every remaining instance for the pair in which the time difference between the first action and the second action for the instance of the pair is within the time threshold; and summing all weighted time based score s for every remaining instance of the pair resulting in a summed score for all remaining instances of the pair, in which remaining instances of the pair having a smaller time difference between the first action and second action contribute greater to the summed score than remaining instances of the pair having a greater time difference between the first action and the second action.

According to another embodiment, method 200 further includes: indexing at least the time field of the input table; and in which analyzing the input table to generate one or more pairs of first actions and items to second actions and items and a time based score for each of the one or more pairs includes terminating a query prematurely based on the indexed time field exceeding a time threshold indicating permissible records for consideration by the analyzing. For example, Input data may be organized in such a way that a specified time chunk can be easily accessed. An index may be useful where such data is stored in a table. If the data is stored somewhere else, for example a log file, then such data can be ordered according to date. For example in each increment, the analyzing iteration cycle simply processes the last part of the log which is at the end of the file due to the ordering.

According to another embodiment, analyzing the input table to generate one or more pairs of first actions and items to second actions and items and a time based score for each of the one or more pairs includes executing an SQL query to: count all pairs; group all pairs by action_a/item_a and action_b/item_b; and filter via a WHERE clause of the SQL query to negate any pairs exceeding a time threshold based on the time field. According to another variant of such an embodiment, the WHERE clause of the SQL query is to further: filter out any instances of a pair having a negative time difference indicating action_b/item_b occurred prior in time to action_a/item_a.

According to another embodiment, analyzing the input table to generate one or more pairs of first actions and items to second actions and items and a time based score for each of the one or more pairs includes: instituting a directionality requirement for establishment of a pair such that a first action and item that occurs in time before a second action and item represents a valid pair but the second action and item occurring in time before the first action and item is not a valid pair.

According to another embodiment, analyzing the input table to generate the one or more pairs and the time based score for each of the one or more pairs includes: applying the analyzing to a plurality of overlapping time chunks, based on the time data recorded. According to a variant of such an embodiment, applying the analyzing to the plurality of overlapping time chunks includes: incrementally analyzing the input table by iteratively performing the analyzing against the input table for each of the plurality of overlapping time chunks, in which each iteration includes: (a) selecting one of the plurality of overlapping time chunks having records therein corresponding to a period of time subsequent to the preceding incremental analyzing based on the time data recorded; and (b) analyzing the selected one of the plurality of overlapping time chunks without re-analyzing the remaining plurality of overlapping time chunks having records therein corresponding to a period of time during or prior to the preceding incremental analyzing based on the time data recorded.

Thus, the analysis may be applied to all of the data at hand, up until the present time or up until the latest partitioned overlapping time chunk, but then later, such as 20 minutes later or the next day, when there is new data for consideration, the new data may be analyzed as an incremental addition for only that data within the latest overlapping time chunk, without having to re-process the analysis for all of the preceding data or all of the date before the latest overlapping time chunk. Old events may still be relevant, though they will not be scored as well as pairs established from wholly new data because of the passing of time reducing the weighting or contribution value that will be attributed to the pairs established using the old dataset having actions+items so far in the past. Further still, because the old events are sufficiently in the past, it may be appropriate to trigger an early exit or an early cut off from the analysis of the older data due to the amount of time being in excess of a specified time threshold. For instance, the analysis may dictate that only data pairs having less than 20 minutes difference in time are considered, or whatever the incremental value is chosen to be. Analysis then applied to the new incremental dataset will yield far fewer determined pairs from the older data, unless there were, perhaps, edge cases, such as an item+action toward the end of the prior time chunk and another item+action near the beginning of the next time chunk for the same user, in which case a pair is more likely to be established, despite straddling two disparate time chunks.

According to another embodiment, method 200 further includes: receiving as input, the plurality of access requests from one or more client devices, each of the one or more client devices being communicably interfaced with the host organization via a network; and sending unsolicited recommendations for records to be viewed to at least one of the client devices without regard to which of the client devices are associated with any of the plurality of access requests. According to a variant of this embodiment, the data stored within the host organization includes the data being stored within a multi-tenant database system of the host organization; and in which the method 200 further includes: receiving as input, the plurality of access requests from one or more client devices of a plurality of customer organizations, in which each customer organization is an entity selected from the group consisting of: a separate and distinct remote organization, an organizational group within the host organization, a business partner of the host organization, or a customer organization that subscribes to cloud computing services provided by the host organization.

According to another embodiment, the multi-tenant database system includes elements of hardware and software that are shared by a plurality of separate and distinct customer organizations, each of the separate and distinct customer organizations being remotely located from the host organization having the multi-tenant database system operating therein.

In accordance with one embodiment, there is a non-transitory computer readable storage medium having instructions stored thereon that, when executed by a processor in a host organization, the instructions cause the host organization to perform operations including: receiving as input, a plurality of access requests for data stored within the host organization and a corresponding plurality of actions for the data to which access is requested; accessing an input table having a time field, action field, item field, and agent field therein; recording time data and agent data for each of the received plurality of access requests and the corresponding plurality of actions; recording an item within the item field and an action within the action field for each of the received plurality of access requests and the corresponding plurality of actions based on the action performed on an item of the data to which access is requested; and analyzing the input table to generate one or more pairs of first actions and items to second actions and items and a time based score for each of the one or more pairs in a collaborative filter table as output, in which the time based score is dependent upon a time between the actions for each of the one or more pairs.

Figure 3:
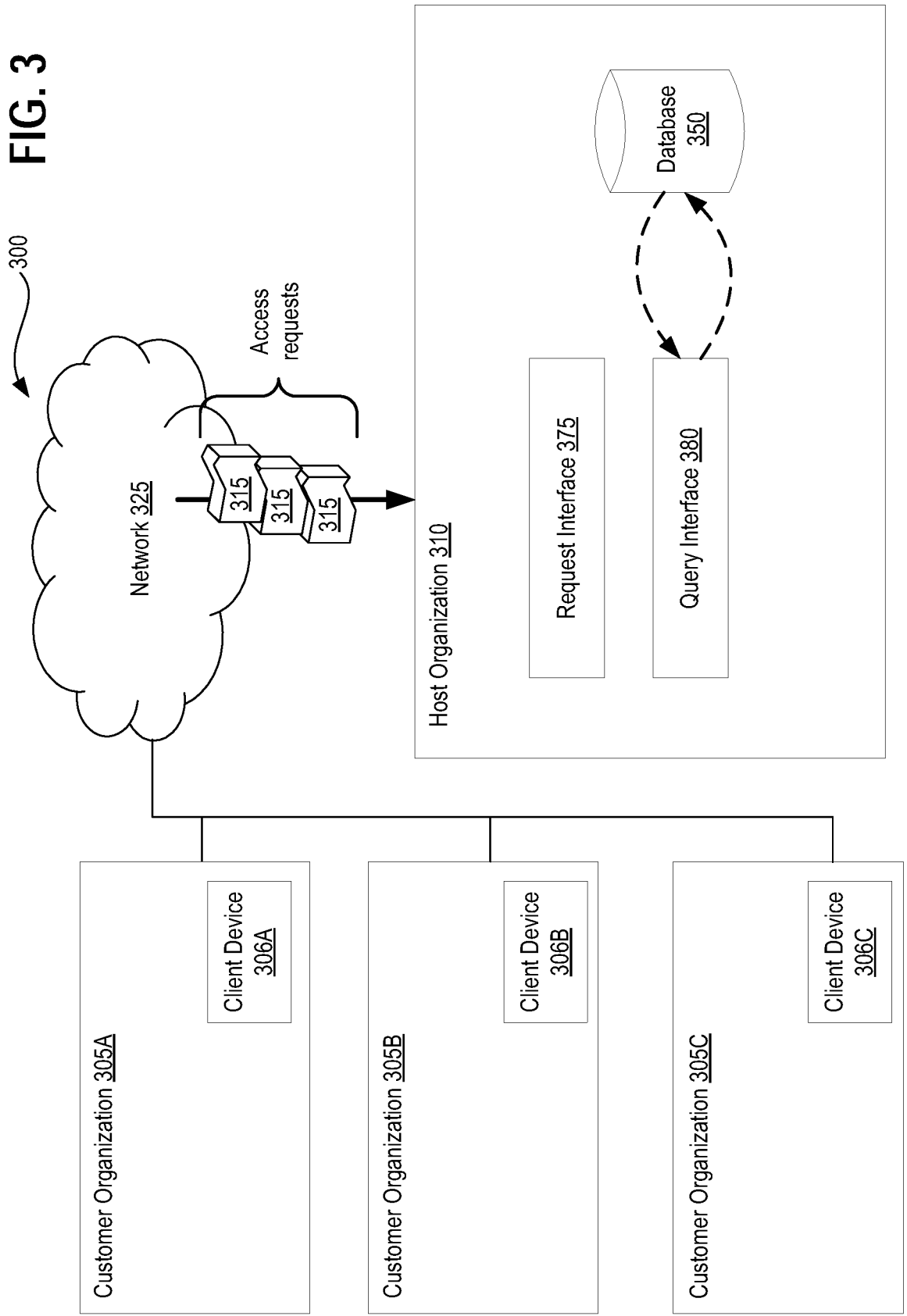
FIG. 3 depicts an alternative exemplary architectural overview of the environment in which embodiments may operate.

FIG. 3 depicts an alternative exemplary architectural overview 300 of the environment in which embodiments may operate. In particular, there are depicted multiple customer organizations 305A, 305B, and 305C. Obviously, there may be many more customer organizations than those depicted. In the depicted embodiment, each of the customer organizations 305A-C includes at least one client device 306A, 306B, and 306C. A user may be associated with such a client device, and may further initiate requests to the host organization 310 which is connected with the various customer organizations 305A-C and client devices 306A-C via network 325. Access requests 315 are depicted as being communicated to the host organization 310 from such client devices 306A-C. The host organization may responsively issue responses and results for viewing to the respective client devices 306A-C depending on the request. The host organization 310 may also or alternatively send unsolicited recommendations to the client devices 306A-C, for example, recommendations for next records that may be viewed based on the analysis described herein and based further on records currently or recently viewed by such a client device 306A-C.

Within host organization 310 is a request interface 375 which receives the access requests 315 and other requests from the client devices 306A-C. Further depicted is a query interface 380 which operates to query database 350 in fulfillment of such access requests 315.

Figure 4:
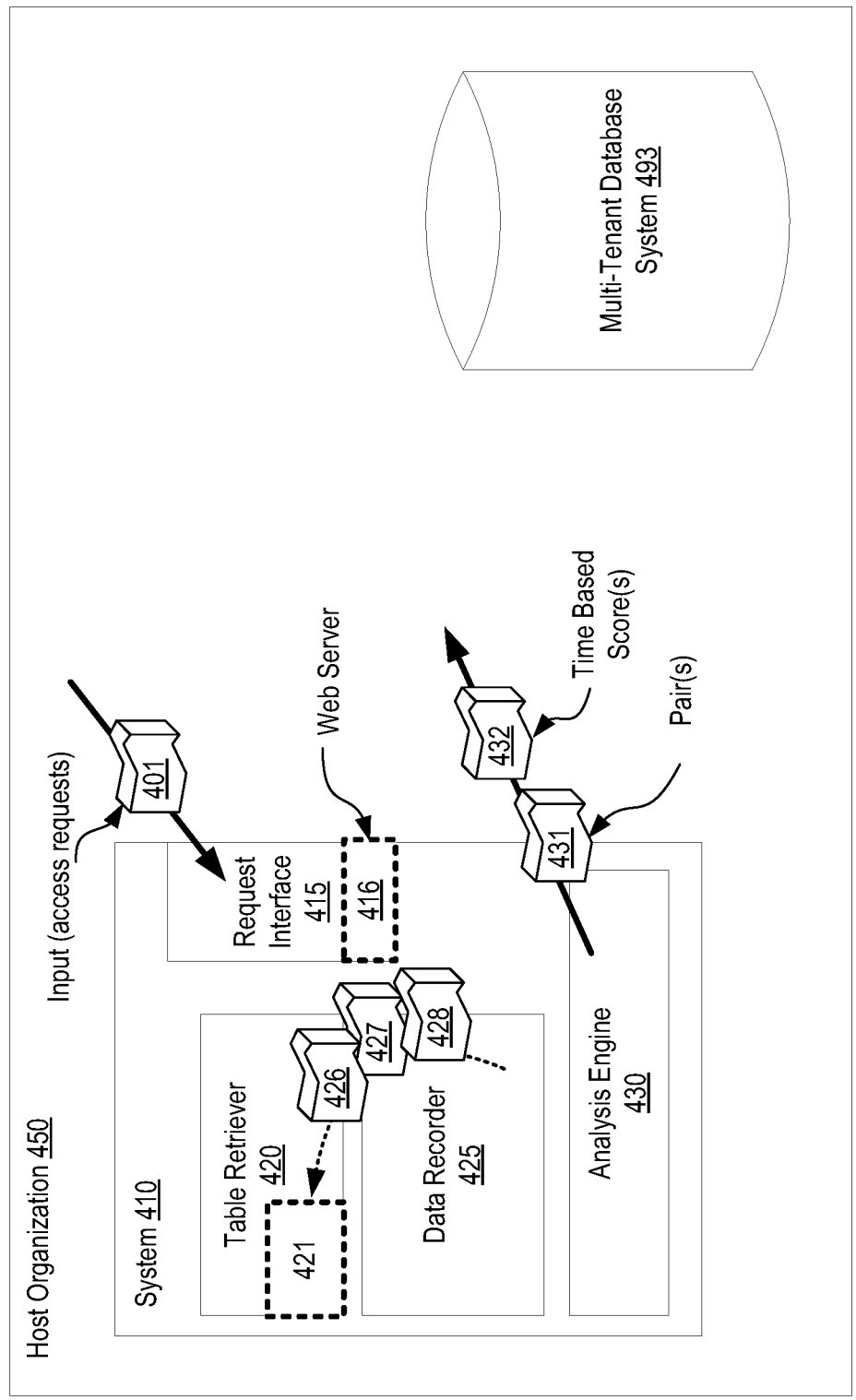
FIG. 4 depicts an exemplary architectural overview of the environment in which embodiments may operate.

FIG. 4 depicts an exemplary architectural overview 400 of the environment in which embodiments may operate.

According to one embodiment, there is a system 410 to operate within a host organization 450, in which the system 410 includes: a processor to execute instructions; a request interface 415 to receive as input 401, a plurality of access requests for data stored within a database 493 of the host organization 450 and a corresponding plurality of actions for the data to which access is requested. Such a system 410 further includes: a table retriever 420 to access an input table 421 having a time field, action field, and item field therein; a data recorder 425 operable in conjunction with the table retriever 420, in which the data recorder 425 is to: (a) record time data 426 within the time field for each of the received plurality of access requests 401 and the corresponding plurality of actions, and in which the data recorder 425 is to further (b) record an item 427 within the item field and an action 428 within the action field for each of the received plurality of access requests 401 and the corresponding plurality of actions based on the action performed on an item of the data to which access is requested; and an analysis engine 430 to analyze the input table 421 to generate an output table or a collaborative filter table as output, the respective output table having therein one or more pairs 431 of first actions and items to second actions and items and a time based score 432 for each of the one or more pairs 431.

According to one embodiment of the system 410, there is a web-server 416 to implement the request interface 415 to receive as input, the plurality of access requests 401 from one or more client devices from among a plurality of customer organizations communicably interfaced with the host organization via a network; a multi-tenant database system 493 to implement the database (e.g., database 350 of FIG. 3); and in which each customer organization (e.g., 305A-C of FIG. 3) constitutes an entity selected from the group consisting of: a separate and distinct remote organization, an organizational group within the host organization, a business partner of the host organization, or a customer organization that subscribes to cloud computing services provided by the host organization.

Figure 5:
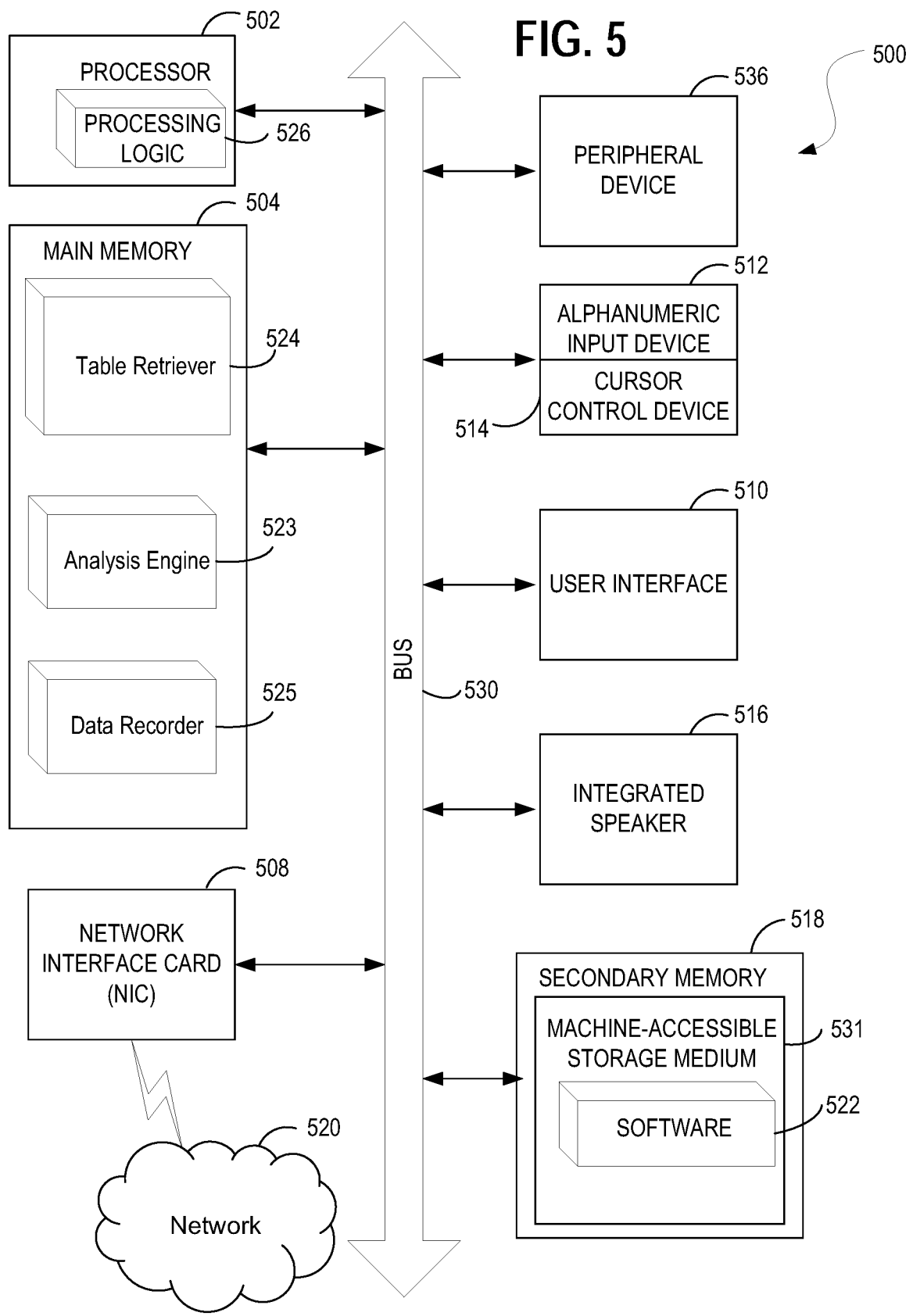
FIG. 5 illustrates a diagrammatic representation of a machine in the exemplary form of a computer system, in accordance with one embodiment.

FIG. 5 illustrates a diagrammatic representation of a machine 500 in the exemplary form of a computer system, in accordance with one embodiment, within which a set of instructions, for causing the machine/computer system 500 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and a persistent database and/or a multi-tenant database implementation), which communicate with each other via a bus 530. Main memory 504 includes a table retriever 524 to access an input table having a time field, action field, and item field therein which is operable in conjunction with a data recorder 525. Main memory 504 further includes an analysis engine 523 to analyze the input table to generate one or more pairs of first actions and items to second actions and items and a time based score for each of the one or more pairs as described herein. Main memory 504 further includes data recorder 525 to record time data, item, and action data. Main memory 504 and its sub-elements are operable in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality which is discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc.).

The secondary memory 518 may include a non-transitory machine-readable or computer readable storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508.

Figure 6:
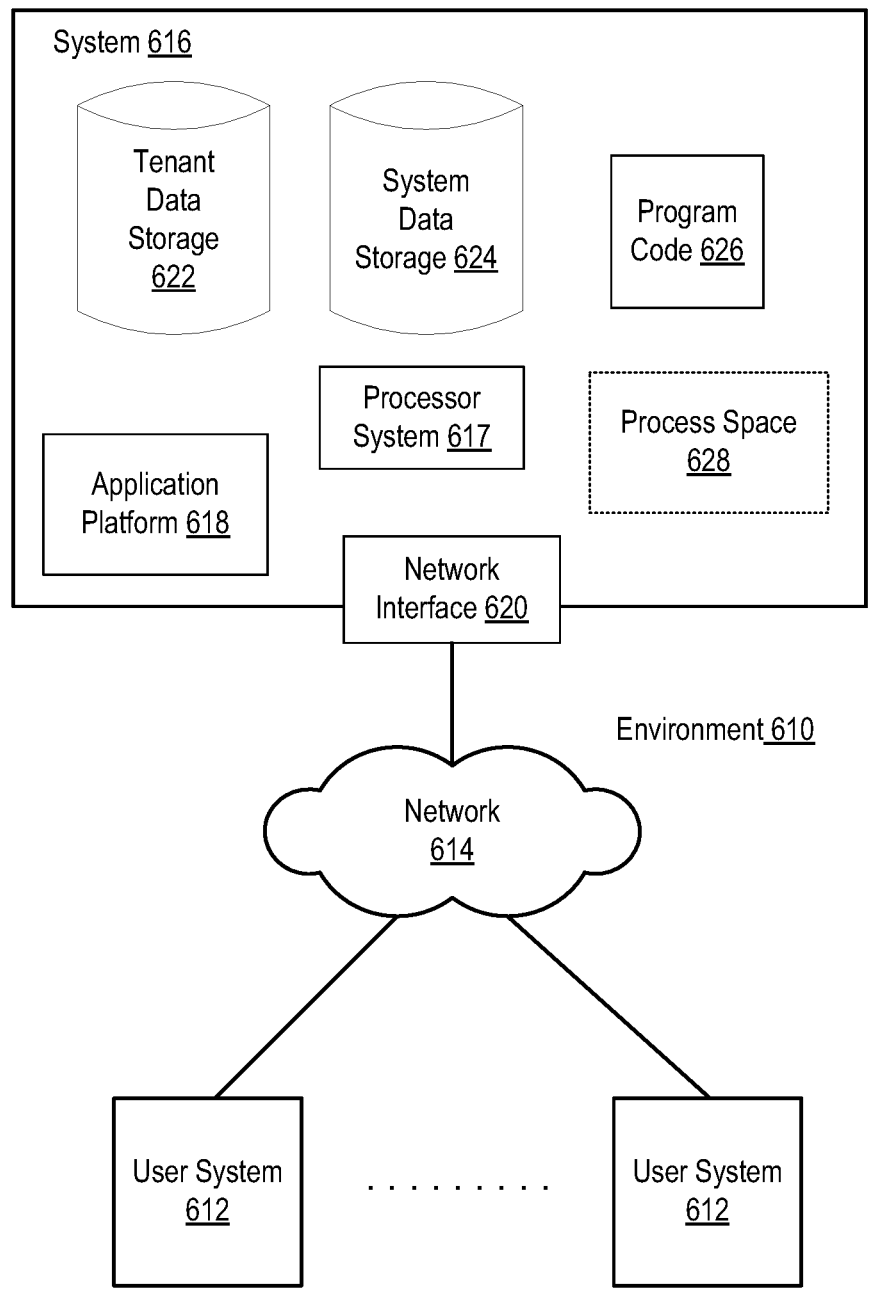
FIG. 6 illustrates a block diagram of an example of an environment in which an on-demand database service might be used.

FIG. 6 illustrates a block diagram of an example of an environment 610 in which an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" is used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 may include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units.

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
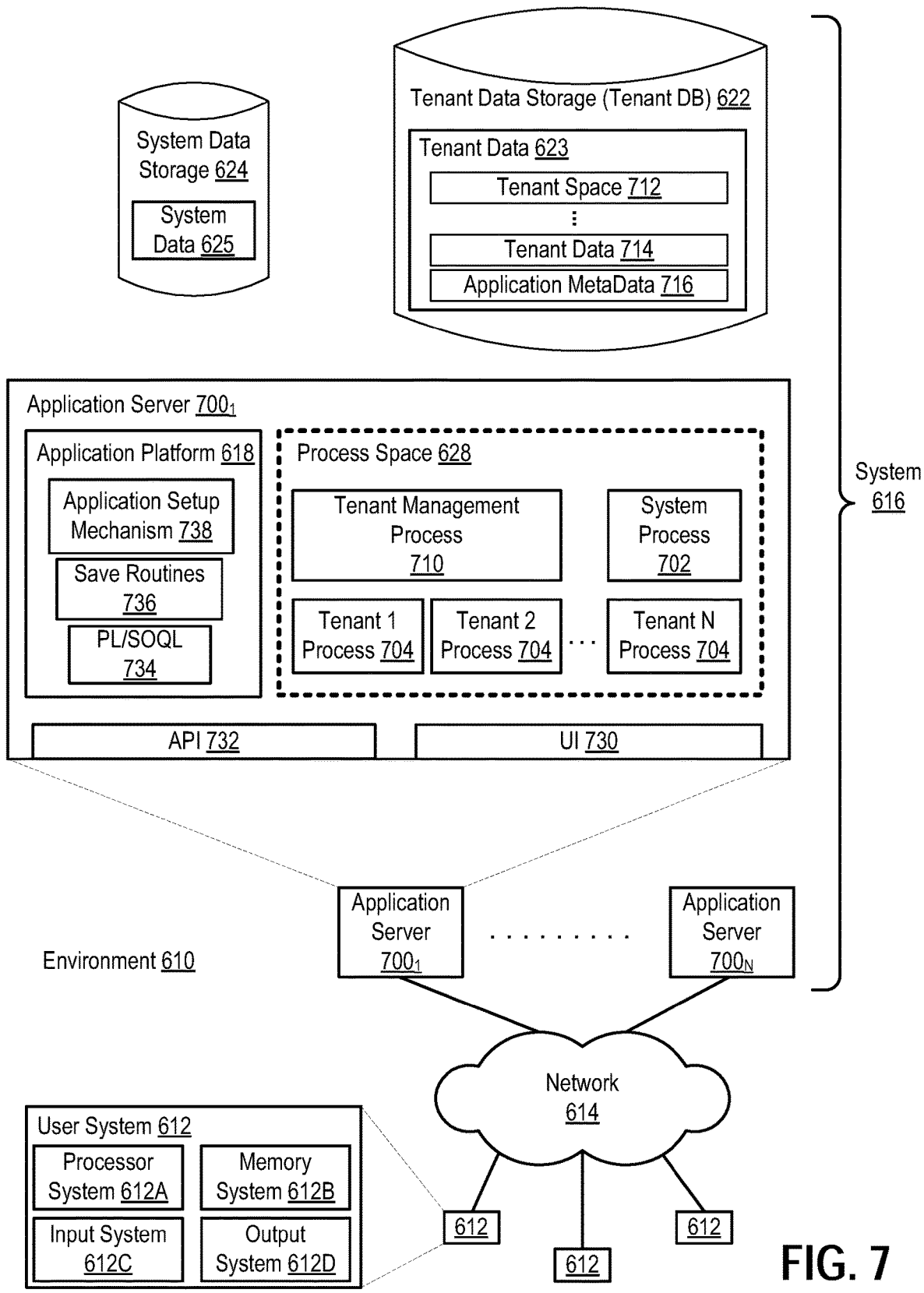
FIG. 7 illustrates a block diagram of an embodiment of elements of FIG. 6 and various possible interconnections between these elements.

FIG. 7 illustrates a block diagram of an embodiment of elements of FIG. 6 and various possible interconnections between these elements. FIG. 7 also illustrates environment 610. However, in FIG. 7, the elements of system 616 and various interconnections in an embodiment are further illustrated. FIG. 7 shows that user system 612 may include a processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process space 710 for example. Invocations to such applications may be coded using PL/SOQL 734 that provides a programming language style interface extension to API 732. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user may hit three different application servers 700, and three requests from different users may hit the same application server 700. In this manner, system 616 is multi-tenant, in which system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a system having at least a processor and a memory therein, wherein the method comprises:
   receiving as input at the system, a plurality of access requests by a plurality of users requesting access to data stored by the system; identifying a plurality of actions associated with the data to which access is requested, wherein each of the plurality of actions identified are actions by a first user represented within the plurality of access requests;
   generating a plurality of related pairs by the first user from the plurality of access requests received as input and the data stored by the system, each of the plurality of related pairs including (i) a respective first action and first item, (ii) a respective second action and second item and (iii) a time difference between access requests by the first user for the related pair determined based on time data for each of the respective first action and item accessed by the first user and the respective second action and item as accessed by the first user;
   generating additional related pairs for additional actions by one or more additional users, the additional related pairs being generated from the plurality of access requests for the data two which access is requested by the additional users;
   wherein every related pair among the plurality of related pairs corresponds to exactly one of the plurality of users in which both first and second access requests for every one of the plurality of related pairs are associated with a same user for the respective pair;
   analyzing the plurality of related pairs by the first user and the additional related pairs for the one or more additional users to generate a time based score for each of the plurality of related pairs and the additional related pairs, wherein the time based score is dependent upon the time difference between the access requests of the plurality of related pairs and the additional related pairs; and issuing a recommendation to one of the plurality of users for a record, wherein the recommendation is based on the time based score.

2. The method of claim 1:

wherein the agent corresponds to a user having initiated the action on the item; and wherein the input table records each of (i) agent, (ii) action, (iii) item, and (iv) time, for each of the plurality of access requests received as input.

3. The method of claim 1, wherein issuing the recommendation to one of the plurality of users comprises issuing an unsolicited recommendation to the respective user responsive to receiving from the respective user a view request for the record as specified by the respective user.

4. The method of claim 1, further comprising:

accessing an input table having a time field, action field, item field, and agent field therein; and recording time data within the time field for each of the received plurality of access requests and the corresponding plurality of actions; and wherein analyzing the plurality of related pairs by the first user and the additional related pairs for the one or more additional users to generate the time based score comprises analyzing the input table to generate the plurality of related pairs and the additional related pairs.

5. The method of claim 1, further comprising:

accessing an input table having a time field, action field, item field, and agent field therein; and recording time data within the time field for each of the received plurality of access requests and the corresponding plurality of actions;

wherein analyzing the plurality of related pairs by the first user and the additional related pairs for the one or more additional users to generate the time based score comprises analyzing the input table;

wherein the analysis generates as output the plurality of related pairs by the first user and the additional related pairs for the one or more additional users; and wherein the generated output for each of the one or more pairs specifies at least:

a first action and a first item and a second action and a second item as a related pair when an entity performing the first action on the first item as the data requested with a first access request also performs the second action on the second item as the data requested with a second access request by the same entity; and the time based score generated, wherein the time based score is based at least in part on a difference between first time data recorded for the first action on the first item and second time data recorded for the second action on the second item.

6. The method of claim 1, further comprising:

increasing scoring of the time based score for pairs occurring with greater frequency over pairs occurring with lesser frequency.

7. The method of claim 1, further comprising:

increasing scoring of the time based score for pairs having elements occurring closer in time to one another over pairs having elements occurring greater in time from one another.

8. The method of claim 7, wherein increasing scoring for pairs having elements occurring closer in time to one another over pairs having elements occurring greater in time from one another comprises:

determining a difference between first time data recorded for a first action on a first item of the pair and second time data recorded for a second action on a second item of the pair; and performing one of the following special case operations to the difference:

(a) applying a linear weighting to the difference of the pair, wherein pairs having elements closer in time to one another result in a greater linear weighting over pairs having elements occurring greater in time from one another;

(b) applying a weighting proportional to a function f of the time difference, wherein f is monotonically decreasing so that a greater time difference results in a lower score;

(c) applying an exponential weighting function f where $f=2^{\wedge}(-k*timeDiff)$; or (d) applying a squared weighting function f where $f=timeDiff^{\wedge}(-0.5)$.

9. The method of claim 1, wherein generating the plurality of related pairs and the additional related pairs comprises:

establishing a pair when any entity performing a first action on a first item also performs a second action on a second item; and applying a weighted time based score to the pair established based on a difference between first time data recorded for the first action on the first item and second time data recorded for the second action on the second item.

10. The method of claim 9, further comprising:

establishing a second pair, identical to the first pair, when any second entity performing a first action on a first item also performs a second action on a second item;

applying a second weighted time based score to the second pair established based on a difference between third time data recorded for the first action on the first item and fourth time data recorded for the second action on the second item; and summing the first weighted time based score for the first pair and the second weighted time based score for the second pair, wherein the summing represents both frequency of the established pairs and time relatedness of the established pairs' respective elements.

11. The method of claim 1, further comprising:

partitioning the generated plurality of related pairs into a plurality of overlapping time chunks; and applying time-partitioned collaborative filtering to each of two distinct sets of agent-action-item-times to identify related pairs within the plurality of overlapping time chunks, wherein any one of the plurality of related pair is identified when a first action and a first item by the same user are matched with a second action and a second item by the same user within one of the plurality of overlapping time chunks; and analyzing only the related pairs identified as having occurred within one of the plurality of overlapping time chunks without any consideration given to any related pair occurring within a data population which does not occur within one of the plurality of overlapping time chunks.

12. The method of claim 1, further comprising:

partitioning the generated plurality of related pairs into a plurality of overlapping time chunks;

iteratively analyzing the generated plurality of related pairs, wherein each iteration of analysis evaluates only related pairs within a single one of the plurality of overlapping time chunks;

wherein each iteration of analysis comprises generating a predictive value for the related pairs within the single one of the plurality of overlapping time chunks being analyzed by decreasing a weighting for the related pairs having elements farther apart in time based on the time difference of each related pair and by increasing the weighting of the related pairs having elements closer in time to one another based on the time difference of each related pair; and summing the weightings from all of the plurality of overlapping time chunks to establish a time based score for each related pair, wherein the time based score for each related pair indicates the predictive value for the related pair.

13. The method of claim 1, further comprising:

recording time data and agent data for each of the received plurality of access requests and the corresponding plurality of actions based on the action performed on an item of the data to which access is requested; and recording time data within the time field for each of the received plurality of access requests and the corresponding plurality of actions into an input table having a time field, action field, item field, and agent field therein.

14. The method of claim 1, further comprising:

accessing an input table having a time field, action field, item field, and agent field therein; and recording time data within the time field for each of the received plurality of access requests and the corresponding plurality of actions; and wherein analyzing the plurality of related pairs by the first user and the additional related pairs for the one or more additional users to generate the time based score comprises generating a collaborative filter table as output, wherein the collaborative filter table records as output for each of the one or more pairs:

(i) action_a;
(ii) item_a subjected to action_a by any entity;
(iii) action_b;
(iv) item_b subjected to action_b by the same entity; and
(v) the time based score having been derived based at least in part on a time difference between item_a subjected to action_a and item_b subjected to action_b by the same entity.

15. The method of claim 1, wherein the analyzing comprises:

instituting a directionality requirement for establishment of a pair such that a first action and item that occurs in time before a second action and item represents a valid pair but the second action and item occurring in time before the first action and item is not a valid pair.

16. Non-transitory computer-readable storage medium having instructions stored thereon that, when executed by a processor of a system, the instructions cause the system to perform operations comprising:

receiving as input at the system, a plurality of access requests by a plurality of users requesting access to data stored by the system; identifying a plurality of actions associated with the data to which access is requested, wherein each of the plurality of actions identified are actions by a first user represented within the plurality of access requests;

generating a plurality of related pairs by the first user from the plurality of access requests received as input and the data stored by the system, each of the plurality of related pairs including (i) a respective first action and first item, (ii) a respective second action and second item and (iii) a time difference between access requests by the first user for the related pair determined based on time data for each of the respective first action and item accessed by the first user and the respective second action and item as accessed by the first user;

generating additional related pairs for additional actions by one or more additional users, the additional related pairs being generated from the plurality of access requests for the data two which access is requested by the additional users;

wherein every related pair among the plurality of related pairs corresponds to exactly one of the plurality of users in which both first and second access requests for every one of the plurality of related pairs are associated with a same user for the respective pair;

analyzing the plurality of related pairs by the first user and the additional related pairs for the one or more additional users to generate a time based score for each of the plurality of related pairs and the additional related pairs, wherein the time based score is dependent upon the time difference between the access requests of the plurality of related pairs and the additional related pairs; and issuing a recommendation to one of the plurality of users for a record, wherein the recommendation is based on the time based score.

17. The non-transitory computer-readable storage medium of claim 16, wherein the analyzing further comprises: eliminating any instance of a pair from scoring when a time difference between a first action and a second action for the instance of the pair exceeds a time threshold;

applying a weighted time based score to every remaining instance for the pair in which the time difference between the first action and the second action for the instance of the pair is within the time threshold; and summing all weighted time based scores for every remaining instance of the pair resulting in a summed score for all remaining instances of the pair, wherein remaining instances of the pair having a smaller time difference between the first action and second action contribute greater to the summed score than remaining instances of the pair having a greater time difference between the first action and the second action.

18. The non-transitory computer-readable storage medium of claim 16, wherein issuing the recommendation to one of the plurality of users comprises issuing an unsolicited recommendation to the respective user responsive to receiving from the respective user a view request for the record as specified by the respective user.

19. A system comprising:

a processor to execute instructions;

a request interface to receive as input at the system, a plurality of access requests by a plurality of users requesting access to data stored by the system; an analysis engine to identify a plurality of actions associated with the data to which access is requested, wherein each of the plurality of actions identified are actions by a first user represented within the plurality of access requests;

the analysis engine to generate a plurality of related pairs by the first user from the plurality of access requests received as input and the data stored by the system, each of the plurality of related pairs including (i) a respective first action and first item, (ii) a respective second action and second item and (iii) a time difference between access requests by the first user for the related pair determined based on time data for each of the respective first action and item accessed by the first user and the respective second action and item as accessed by the first user;

the analysis engine to generate additional related pairs for additional actions by one or more additional users, the additional related pairs being generated from the plurality of access requests for the data two which access is requested by the additional users;

wherein every related pair among the plurality of related pairs corresponds to exactly one of the plurality of users in which both first and second access requests for every one of the plurality of related pairs are associated with a same user for the respective pair;

the analysis engine to further analyze the plurality of related pairs by the first user and the additional related pairs for the one or more additional users to generate a time based score for each of the plurality of related pairs and the additional related pairs, wherein the time based score is dependent upon the time difference between the access requests of the plurality of related pairs and the additional related pairs; and the analysis engine to further issue a recommendation to one of the plurality of users for a record, wherein the recommendation is based on the time based score.

20. The system of claim 19, further comprising:

a web-server to implement the request interface to receive as the input, the plurality of access requests originating from one or more client devices from among a plurality of customer organizations communicably interfaced with a host organization having the system embodied therein via a network; and wherein issuing the recommendation to one of the plurality of users comprises returning an unsolicited recommendation to one of the one or more client devices via the web-server.

* * * * *